United States Patent
Eriguchi et al.

(10) Patent No.: US 7,336,373 B2
(45) Date of Patent: Feb. 26, 2008

(54) SURFACE SHAPE MEASURING APPARATUS AND SURFACE SHAPE MEASURING METHOD

(75) Inventors: Fuyuki Eriguchi, Osaka (JP); Katsuhiko Tachibana, Osaka (JP); Mamoru Kawahara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 378 days.

(21) Appl. No.: 11/092,549

(22) Filed: Mar. 29, 2005

(65) Prior Publication Data

US 2005/0219551 A1    Oct. 6, 2005

(30) Foreign Application Priority Data

Mar. 31, 2004  (JP)  .............................. 2004-102775
Nov. 26, 2004  (JP)  .............................. 2004-342864

(51) Int. Cl.
*G01B 11/30*  (2006.01)
*G06K 9/46*   (2006.01)

(52) U.S. Cl. ..................... 356/601; 356/602; 382/203
(58) Field of Classification Search ........ 356/600–601, 356/2, 614–616, 639–640; 382/141, 152, 382/203
See application file for complete search history.

(56) References Cited

U.S. PATENT DOCUMENTS

| | | | |
|---|---|---|---|
| 3,355,590 A | | 11/1967 | Bertram |
| 4,721,388 A | * | 1/1988 | Takagi et al. ............... 356/602 |
| 4,838,696 A | * | 6/1989 | Pryor ......................... 356/602 |
| 4,988,984 A | * | 1/1991 | Gonzalez-Lopez .......... 345/660 |
| 5,156,053 A | * | 10/1992 | Shiraishi et al. ............... 73/849 |
| 5,291,270 A | * | 3/1994 | Koch et al. .................. 356/602 |
| 5,343,402 A | * | 8/1994 | Matsuura et al. ........... 700/161 |
| 6,574,519 B2 | * | 6/2003 | Uegaki ......................... 700/90 |
| 6,683,985 B1 | * | 1/2004 | Kase et al. .................. 382/203 |
| 2003/0112448 A1 | | 6/2003 | Maidhof et al. |

FOREIGN PATENT DOCUMENTS

| | | | |
|---|---|---|---|
| GB | 2 308 443 A | | 6/1997 |
| JP | H08-043041 | | 2/1996 |
| JP | 09222313 A | * | 8/1997 |
| JP | 2003-533685 A2 | | 11/2003 |

\* cited by examiner

*Primary Examiner*—Sang H. Nguyen
(74) *Attorney, Agent, or Firm*—Akerman Senterfitt; Jean C. Edwards, Esq.

(57) ABSTRACT

In order to provide a surface shape measuring apparatus and a surface shape measuring method capable of detecting a distortion on the curved surface of a work precisely, a laser displacement meter 17 disposed to the outside surface of a door panel 51 of a curved shape at a confronting position, a Z-axis servo motor 24 to move the laser displacement meter 17 along the top-and-bottom direction with respect to the outside surface of the door panel 51, an X-axis servo motor 22 to move the laser displacement meter 17 along the left-and-right direction, and a Y-axis servo motor 26 to move the laser displacement meter 17 along an confronting direction in which the laser displacement meter 17 and the outside surface of the door panel 51 oppose each other, are provided, and a CPU 21 controls the Y-axis servo motor 26 in such a manner that a constant distance is maintained in the confronting direction between the laser displacement meter 17 and the outside surface of the door panel 51.

17 Claims, 12 Drawing Sheets

(a)

(b)

(a)

(b)

(a)

(b)

SURFACE SHAPE MEASURING APPARATUS AND SURFACE SHAPE MEASURING METHOD

BACKGROUND OF THE INVENTION

1. Field of the invention

The present invention relates to a surface shape measuring apparatus and a surface shape measuring method for measuring the shape of a curved surface of a work.

2. Description of the Prior Art

Recently, the automobile industry is making efforts to reduce a body weight in improving fuel efficiency and reducing emissions. Under these circumstances, there is a tendency to make a steel plate thinner, which, however, raises a problem that the steel plate becomes insufficient. A countermeasure against an insufficient strength of the steel plate is taken by making a thin steel plate from a high-strength material, such as a high-tensile steel plate, or providing a reinforcing bar. Using a high-tensile steel plate, however, raises a problem that the manufacturing costs are increased in comparison with typical steel plates. Also, because a reinforcing bar is made of metal, there is a problem-that providing the reinforcing bar has an adverse effect on a weight reduction.

With this being the situation, an increasingly adopted method for suppressing an increase in weight while compensating for a reduction in rigidity is to reinforce a thin steel plate by sticking a sheet of reinforcing material made of resins.

This steel plate reinforcing method with the use of a sheet of reinforcing material can indeed reinforce a steel plate while suppressing an increase of the steel plate in weight; however, as the steel plate is made much thinner to meet the need in recent years, a distortion called "sink" may occur on the surface of the steel plate. This distortion is an extremely minute deformation of the steel plate, and is hard to identify by merely taking a glance. In addition, this distortion is normally checked by visual inspection, and it is therefore difficult to quantify this distortion.

To solve these problems, an attempt is being made to identify a distortion on the surface of the steel plate using a three-dimensional shape measuring apparatus disclosed, for example, in PCT Unexamined Patent Publication No. 2003-533685.

The three-dimensional shape measuring apparatus disclosed in PCT Unexamined Patent Publication 2003-533685 supra measures an object to be measured with a photopolarimetric sensor. The photopolarimetric sensor, however, has a measurable distance range with respect to an object to be measured, and measuring accuracy is low when the measurable distance range is wide whereas measuring accuracy is high when the measurable distance range is narrow.

When the surface of a steel plate is a curved surface, a distance between the photopolarimetric sensor and the curved surface on the surface of the steel plate in a confronting direction is not constant and varies along a curved direction, which raises the need to use a photopolarimetric sensor with a wide measurable distance range.

However, because measuring accuracy of a photopolarimetric sensor with a wide measurable distance range is low, it is difficult to detect a distortion precisely.

In particular, when a coating is applied on the surface of the steel plate, gloss of the coating makes it quite difficult to detect a minute distortion precisely.

SUMMARY OF THE INVENTION

An object of the present invention is therefore to provide a surface shape measuring apparatus and a surface shape measuring method capable of detecting a distortion on a curved surface of a work precisely.

The present invention provides a surface shape measuring apparatus to measure a distortion on a curved surface of a work by scanning a non-contact sensor with respect to the curved surface of the work, including: the non-contact sensor disposed to the curved surface of the work at a confronting position; Z-axis moving means for moving the non-contact sensor with respect to the curved surface of the work along a curved direction in which the curved surface of the work is curved; X-axis moving means for moving the non-contact sensor with respect to the curved surface of the work in a direction intersecting with the curved direction at right angles; and Y-axis moving means for moving the non-contact sensor with respect to the curved surface of the work along a confronting direction in which the non-contact sensor and the curved surface of the work oppose each other while maintaining a constant distance in the confronting direction.

In the surface shape measuring apparatus of the present invention, even when the non-contact sensor is moved along the curved direction of the work by the Z-axis moving means, the Y-axis moving means moves the non-contact sensor along the confronting direction in which the non-contact sensor and the curved surface of the work oppose each other in such a manner that a constant distance is maintained in the confronting direction. It is thus possible to move the non-contact sensor in the direction intersecting with the curved direction of the work at right angles by the X-axis moving means while keeping a constant distance in the confronting direction between the non-contact sensor and the curved surface of the work at different positions along the curved direction of the curved surface of the work.

The surface shape of the curved surface of the work can be therefore measured accurately using the non-contact sensor having high measuring accuracy.

Also, for the surface shape measuring apparatus of the present invention, it is preferable that the work is disposed in such a manner that the curved direction of the curved surface extends along a vertical direction, and the Z-axis moving means moves the non-contact sensor along the vertical direction.

When configured in this manner, the surface shape can be measured while the work is disposed in the vertical direction. It is thus possible to achieve space-saving and efficient measurement in comparison with a case where the surface shape is measured while the work is disposed in the horizontal direction.

Also, for the surface shape measuring apparatus of the present invention, it is preferable that the apparatus further includes a work holding portion, provided as a body separate from the measuring portion, to hold the work in a state that the curved direction of the curved surface of the work extends along a vertical direction.

When the apparatus further includes the work holding portion, it is possible to hold the work firmly in a state that the work is disposed in the vertical direction, which can in turn improve the measuring accuracy of the surface shape.

In addition, because the work holding portion is provided as a body separate from the measuring portion, the surface shape of the curved surface of the work can be measured regardless of the size of the work. Hence, even when the work is large, the surface shape of the work can be measured accurately.

Also, for the surface shape measuring apparatus of the present invention, it is preferable that the work is a metal plate on which a reinforcing material is laminated on a back surface positioned on an opposite side of a surface confronting the non-contact sensor.

Because the surface shape measuring apparatus of the present invention can measure the surface shape of the curved surface of a work accurately using the non-contact sensor, a distortion on the curved surface of the work can be measured accurately even when the work is a metal plate on which a reinforcing material is laminated.

Also, for the surface shape measuring apparatus of the present invention, it is preferable that the reinforcing material is in the form of a sheet made of a resin that cures with external energy, and is sticked to the back surface of the metal plate to reinforce the metal plate.

In a case where the reinforcing material is in the form of a sheet made of a resin that cures with external energy, when the sheet is sticked to the back surface of the metal plate to reinforce the metal plate, a distortion may occur due to a difference of coefficients of linear expansion between the resin and the metal plate. However, the surface shape measuring apparatus of the present invention can also detect such a distortion precisely.

Also, for the surface shape measuring apparatus of the present invention, it is preferable that the work is a steel plate for a vehicle.

The surface shape measuring apparatus of the present invention can detect a distortion precisely even when the work is a coated steel plate for a vehicle with gloss.

Also, for the surface shape measuring apparatus of the present invention, it is preferable that the non-contact sensor is a laser displacement meter.

When the non-contact sensor is a laser displacement meter, the measuring accuracy is quite high. A distortion can be therefore detected more precisely.

Also, for the surface shape measuring apparatus of the present invention, it is preferable that the apparatus further includes processing means for processing scan data obtained by scanning the non-contact sensor, and that the processing means includes contour map creating means for calculating a position coordinate of the curved surface of the work based on the scan data, and creating a contour map used to judge a distortion on the curved surface of the work based on the position coordinate.

By creating a contour map used to judge a distortion on the curved surface of the work by the contour map creating means in the processing means, the presence or absence of a distortion can be judged three-dimensionally and schematically.

Also, it is preferable that the processing means includes smoothing processing means for transforming the position coordinate of the curved surface of the work to a position coordinate on a virtual plane.

By transforming the position coordinate of the curved surface of the work to a position coordinate on a virtual plane by the smoothing processing means, the presence or absence of a distortion can be indicated more explicitly.

Also, it is preferable that the processing means includes differentiation processing means for analyzing the scan data by differentiation.

By analyzing the scan data by differentiation by the differentiation processing means, a distortion can be highlighted further. The distortion can be therefore detected more precisely.

Also, it is preferable that the processing means includes position specifying means for moving the non-contact sensor to a particular confronting position with respect to the curved surface of the work that corresponds to a particular position coordinate, on the basis of the position coordinate of the curved surface of the work.

The position specifying means can move the non-contact sensor to a position at which a distortion occurs on the curved surface of the work after the distortion is detected. This makes it easier to confirm the actual position at which the distortion occurs on the curved surface of the work.

Also, it is preferable that the processing means includes laminated position display means for displaying a laminated position that corresponds to a position of the reinforcing material laminated on the work on the contour map.

The laminated position display means can display a laminated position of the reinforcing material on the work that is mapped on the contour map. This makes it easier to confirm the relation between the distortion and the reinforcing material.

Also, a surface shape measuring method of the present invention is a surface shape measuring method for measuring a distortion on a curved surface of a work by scanning a non-contact sensor with respect to the curved surface of the work, including calculating a position coordinate of the curved surface of the work based on scan data obtained by scanning the non-contact sensor, and creating a contour map used to judge a distortion on the curved surface of the work based on the position coordinate.

By creating a contour map used to judge a distortion on the curved surface of the work, it is possible to judge the presence or absence of a distortion three-dimensionally and schematically.

Also, for the surface shape measuring method of the present invention, it is preferable that the method further includes transforming the position coordinate of the curved surface of the work to a position coordinate on a virtual plane.

By transforming the position coordinate of the curved surface of the work to a position coordinate on a virtual plane, the presence or absence of a distortion can be indicated more explicitly.

Also, for the surface shape measuring method of the present invention, it is preferable that the method further includes analyzing the scan data by differentiation.

When the scan data is analyzed by differentiation, a distortion can be highlighted further. The distortion can be therefore detected more precisely.

Also, for the surface shape measuring method of the present invention, it is preferable that the method further includes moving the non-contact sensor to a particular confronting position with respect to the curved surface of the work that corresponds to a particular position coordinate, on the basis of the position coordinate of the curved surface of the work.

When configured in this manner, the non-contact sensor can be moved to the position at which a distortion occurs on the curved surface of the work after the distortion is detected. This makes it easier to confirm the actual position at which the distortion occurs on the curved surface of the work.

For the surface shape measuring method of the present invention, it is preferable that the method further includes displaying a laminated position that corresponds to a position of the reinforcing material laminated on the work on the contour map.

When the laminated position of the reinforcing material on the work can be mapped and displayed on the contour map, the relation between the distortion and the reinforcing material can be readily understood.

According to the surface shape measuring apparatus of the present invention, it is possible to detect a distortion precisely by measuring the surface shape of the curved surface of the work accurately using the non-contact sensor.

Also, according to the surface shape measuring method of the present invention, it is possible to judge the presence or absence of a distortion three-dimensionally and schematically.

DESCRIPTION OF THE PREFERRED EMBODIMENTS

Figure 1:
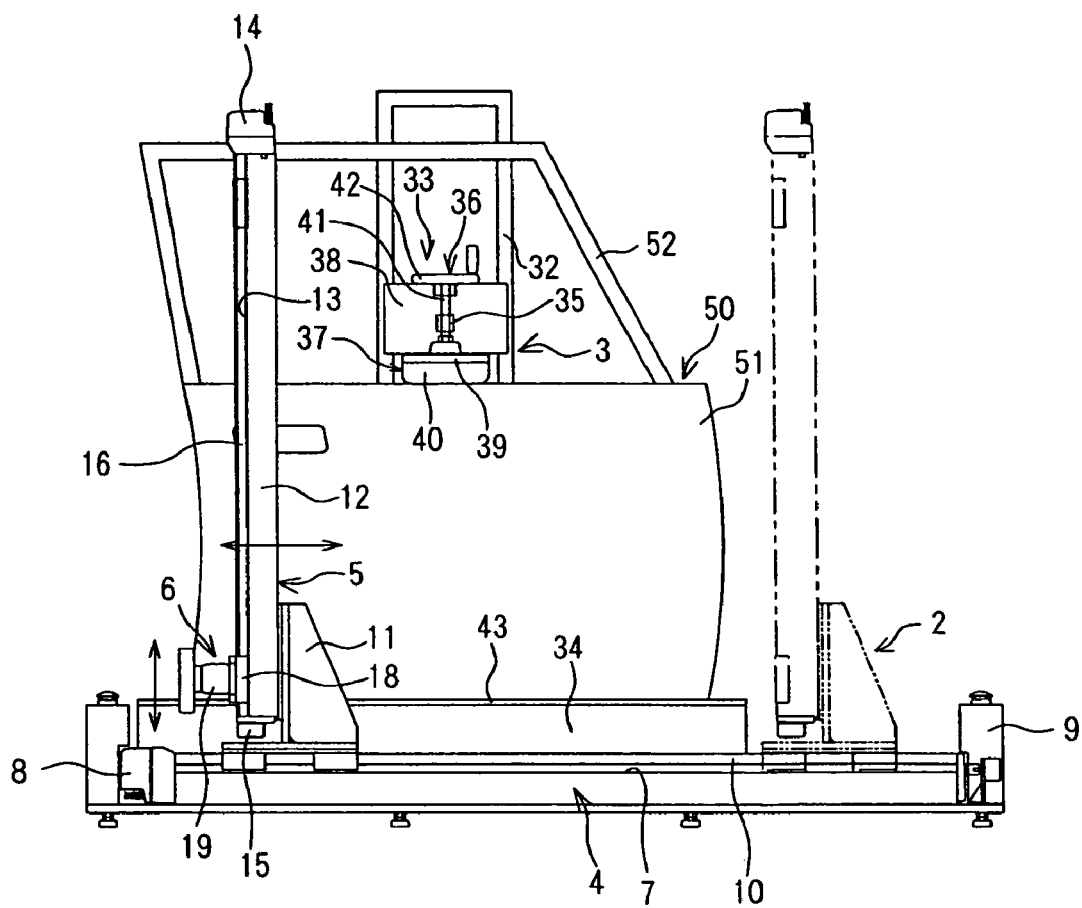
FIG. 1 is a front view showing one embodiment of a surface shape measuring apparatus of the present invention.
Figure 2:
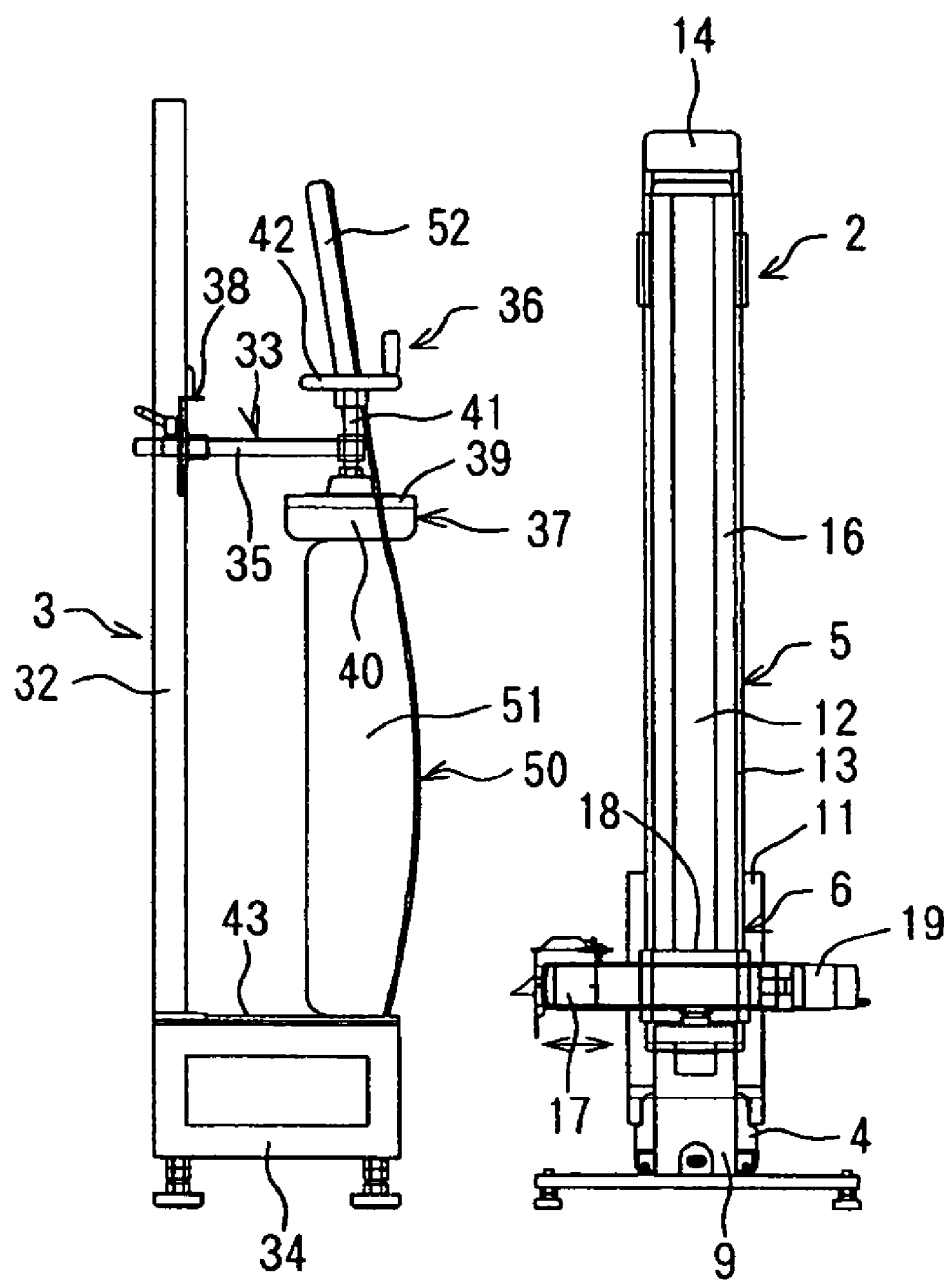
FIG. 2 is a side view of the surface shape measuring apparatus shown in FIG. 1.

FIG. 1 is a front view showing one embodiment of a surface shape measuring apparatus of the present invention. FIG. 2 is a side view of the apparatus.

A surface shape measuring apparatus 1 includes a measuring portion 2 to measure a surface shape of a vehicle door 50 as a work, and a work holding portion 3 to hold the vehicle door 50.

The measuring portion 2 includes a base frame 4, a slide frame 5 supported slidably on the base frame 4, and a sensor portion 6 supported slidably on the slide frame 5.

The base frame 4 comprises a rod body extending in a left-and-right direction defined herein as a horizontal direction, and is placed on the floor. A lateral slide groove 7, into which a lateral slider 11 described below fits slidably, is formed on the top portion of the base frame 4 along the full longitudinal direction. A lateral driving box 8, which houses an X-axis servo motor 22 serving as X-axis moving means for rotationally driving a lateral ball screw 10 described below, is provided in the left end portion (one end in the longitudinal direction) of the base frame 4. Also, a lateral supporting mechanism 9, which supports the lateral ball screw 10 described below rotatably and is provided with X-axis rotary encoders 23 (see FIG. 3), is provided in the right end portion (the other end in the longitudinal direction) of the base frame 4.

The lateral ball screw 10 is provided along the lateral slide groove 7. The lateral ball screw 10 is linked to the X-axis servo motor 22 inside the lateral driving box 8 at one end, and is supported rotatably by the lateral supporting mechanism 9 at the other end.

The slide frame 5 includes the lateral slider 11 supported slidably on the base frame 4, and a slide rod 12 supported by the lateral slider 11.

The lateral slider 11 fits slidably in the lateral slide groove 7 in the base frame 4, and is also supported slidably in the left-and-right direction on the base frame 4. The lateral slider 11 is threaded into the lateral ball screw 10 via a ball bearing.

The slide rod 12 comprises a rod body, and is supported by the lateral slider 11 along a vertical direction. A longitudinal slide groove 13, into which a longitudinal slider 18 described below fits slidably, is formed in the side portion of the slide rod 12 along the full longitudinal direction. Also, a longitudinal driving box 14, which houses a Z-axis servo motor 24 (see FIG. 3) serving as Z-axis moving means for rotationally driving a longitudinal ball screw 16 described below and a Z-axis rotary encoder 25 (see FIG. 3) attached to the Z-axis servo motor 24 (see FIG. 3), is provided at the upper end of the slide rod 12.

In addition, a longitudinal supporting mechanism 15 that supports the longitudinal ball screw 16 described below rotatably is provided at the lower end of the slide rod 12.

The longitudinal ball screw 16 is provided along the longitudinal slide groove 13. The longitudinal ball screw 16 is linked to the Z-axis servo motor 24 inside the longitudinal driving box 14 at one end, and is supported rotatably inside the longitudinal supporting mechanism 15 at the other end.

The sensor portion 6 includes the longitudinal slider 18 supported slidably on the slide rod 12, a sensor holder 19 supported slidably on the longitudinal slider 18, and a laser displacement meter 17 serving as a non-contact sensor and held by the sensor holder 19.

The longitudinal slider 18 fits slidably in the longitudinal slide groove 13 in the slide rod 12, and is also supported slidably in the vertical direction on the slide rod 12. Also, the longitudinal slider 18 is threaded into the longitudinal ball screw 16 via a ball bearing.

The sensor holder 19 is supported on the longitudinal slider. 18 by being disposed along a confronting direction in which it confronts the surface of the vehicle door 50 (that is, a fore-and-aft direction defined herein as the horizontal direction that intersects with both the left-and-right direction and the vertical direction at right angels). A Y-axis servo motor 26 (see FIG. 3) serving as Y-axis moving means and a Y-axis rotary encoder 27 (see FIG. 3) attached to the Y-axis servo motor 26 are housed in the sensor holder 19.

An unillustrated ball screw is provided in the sensor holder 19 along the fore-and-aft direction. This ball screw is linked to the Y-axis servo motor 26 and is also supported rotatably by the sensor holder 19.

The laser displacement meter 17 comprises a reflective photosensor, and is supported slidably in the fore-and-aft direction on the sensor holder 19. Also, the laser displacement meter 17 is threaded into the ball screw provided in the sensor holder 19 via a ball bearing.

The laser displacement meter 17 may be supported on the sensor holder 19 through the use of a rack and pinion mechanism that slides when driven by the Y-axis servo motor 26.

The laser displacement meter 17 detects a distance to the outside surface of a door panel 51 as will be described below.

Figure 3:
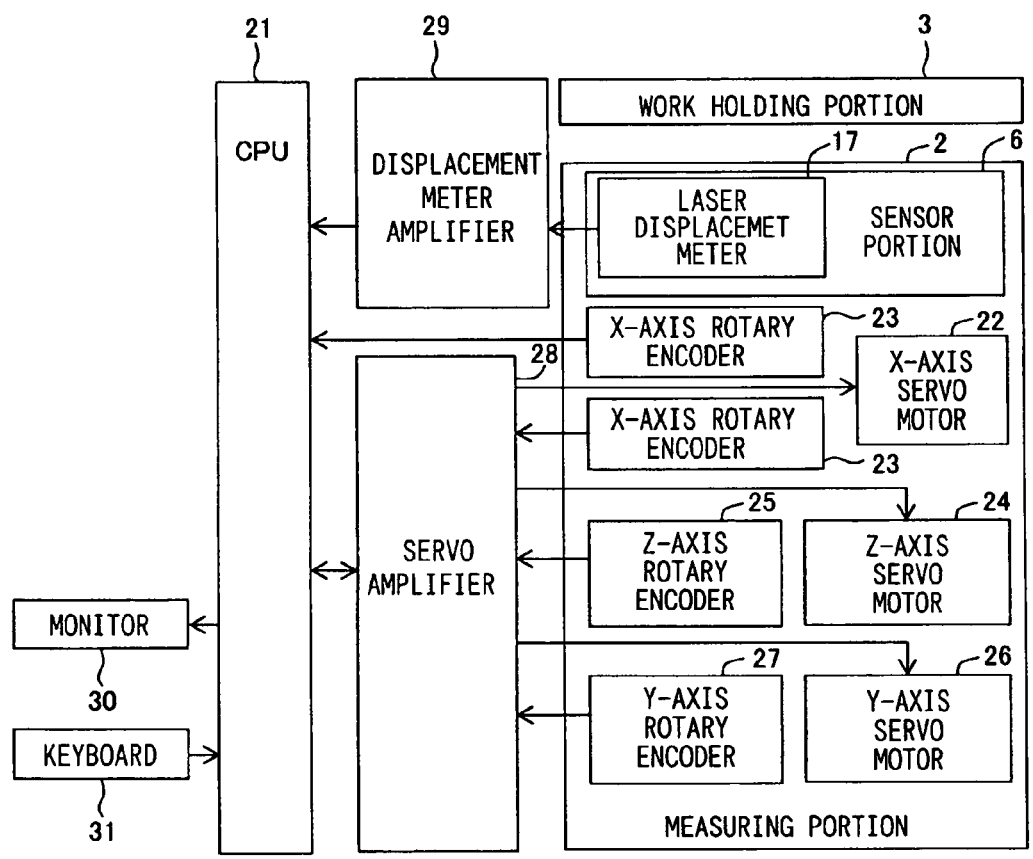
FIG. 3 is a block diagram showing a control system in a measuring portion of the surface shape measuring apparatus shown in FIG. 1.

FIG. 3 is a block diagram showing a control system in the measuring portion 2.

Referring to FIG. 3, the measuring portion 2 is provided with a CPU 21 serving as processing means, and a servo amplifier 28 and a displacement meter amplifier 29 are connected to the CPU 21.

The CPU 21 comprises, for example, a personal computer, and a surface shape measuring program for measuring the surface shape of the vehicle door 50, analysis programs for analyzing surface shape data obtained by running the surface shape measuring program, a main control program for running various programs, etc. are pre-installed therein.

The analysis programs include a contour map creating program as contour map creating means, a smoothing processing program as smoothing processing means, a differentiation processing program as differentiation processing means, a position specifying program as position specifying means, and a sticking portion display program as laminated position display means, all of which will be described in detail below.

In addition, a monitor 30 and a keyboard (including a mouse) 31 that the operator manipulates are connected to the CPU 21.

The X-axis servo motor 22, one of the X-axis rotary encoders 23, the Z-axis servo motor 24, the Z-axis rotary encoder 25, the Y-axis servo motor 26, and the Y-axis rotary encoder 27 are connected to the servo amplifier 28.

The X-axis servo motor 22 is driven forward/backward as desired under the control of the servo amplifier 28. When the X-axis servo motor 22 is driven, the lateral ball screw 10 is driven to rotate forward/backward as desired. This causes the lateral slider 11 threaded into the lateral ball screw 10 to move from left to right/from right to left. The slide rod 12 supported on the lateral slider 11 is thus moved from left to right/from right to left while maintaining a standing posture in the vertical direction.

Two X-axis rotary encoders 23 are provided for the X-axis servo motor 22. One of the X-axis rotary encoders 23 detects whether the X-axis servo motor 22 is driven forward or backward and a quantity of driving, which are inputted into the servo amplifier 28. The servo amplifier 28 then calculates the position of the laser displacement meter 17 in the left-and-right direction from the original position described below on the basis of inputs as to whether the X-axis servo motor 22 is driven forward or backward and a quantity of driving.

The other X-axis rotary encoder 23 detects whether the X-axis servo motor 22 is driven forward or backward and a quantity of driving, which are directly inputted into the CPU 21. The CPU 21 then calculates scan position data in the left-and-right direction described below on the basis of inputs from the other X-axis rotary encoder 23 as to whether the X-axis servo motor 22 is driven forward or backward and a quantity of driving.

The Z-axis servo motor 24 is driven forward/backward as desired under the control of the servo amplifier 28. When the Z-axis servo motor 24 is driven, the longitudinal ball screw 16 is driven to rotate forward/backward as desired. This causes the longitudinal slider 18 threaded into the longitudinal ball screw 16 to move upward/downward. The sensor holder 19 supported on the longitudinal slider 18 is thus moved upward/downward while holding its posture along the confronting direction.

The Z-axis rotary encoder 25 detects whether the Z-axis servo motor 24 is driven forward or backward and a quantity of driving, which are inputted into the servo amplifier 28. The servo amplifier 28 then calculates the position of the laser displacement meter 17 in the top-and-bottom direction from the original position described below on the basis of inputs as to whether the Z-axis servo motor 24 is driven forward or backward and a quantity of driving.

The Y-axis servo motor 26 is driven forward/backward as desired under the control of the servo amplifier 28. When the Y-axis servo motor 26 is driven, the unillustrated ball screw provided in the sensor holder 19 is driven to rotate forward/backward as desired. This causes the laser displacement meter 17 threaded into the ball screw to move forward/backward along the confronting direction (fore-and-aft direction).

The Y-axis rotary encoder 27 detects whether the Y-axis servo motor 26 is driven forward or backward and a quantity of driving, which are inputted into the servo amplifier 28. The servo amplifier 28 then calculates the position of the laser displacement meter 17 in the fore-and-aft direction from the original position described below on the basis of inputs as to whether the Y-axis servo motor 26 is driven forward or backward and a quantity of driving.

The servo amplifier 28 moves the laser displacement meter 17 three-dimensionally in the left-and-right direction, the top-and-bottom direction, and the fore-and-aft direction by driving the X-axis servo motor 22, the Z-axis servo motor 24, and the Y-axis servo motor 26, respectively. Also, the servo amplifier 28 detects the position of the laser displacement meter 17 three-dimensionally in the left-and-right direction, the top-and-bottom direction, and the fore-and-aft direction upon receipt of inputs, respectively, from one of the X-axis rotary encoders 23, the Z-axis rotary encoder 25, and the Y-axis rotary encoder 27 as to whether their respective servo motors are driven forward or backward and quantities of driving.

Hence, the servo amplifier 28 controls the movements of the laser displacement meter 17 by controlling the X-axis servo motor 22, the Z-axis servo motor 24, and the Y-axis servo motor 26 by feedback on the basis of inputs from one of the X-axis rotary encoders 23, the Z-axis rotary encoder 25, and the Y-axis rotary encoder 27, respectively.

Also, position data of the laser displacement meter 17 is inputted into the CPU 21 from the servo amplifier 28. Further, the CPU 21 moves the laser displacement meter 17 by controlling the servo amplifier 28.

Because the laser displacement meter 17 is connected to the displacement meter amplifier 29, a quantity of displacement of a confronting distance from the laser displacement meter 17 to the surface of the vehicle door 50 is inputted therein. The, quantity of displacement is then inputted into the CPU 21 from the displacement meter amplifier 29.

The measuring portion 2 is thus able to measure the surface shape of the vehicle door 50 three-dimensionally by means of the CPU 21 on the basis of the position data of the laser displacement meter 17 inputted from the servo amplifier 28, the scan position data in the left-and-right direction calculated using the inputs from the other X-axis rotary encoder 23, and a quantity of displacement of a confronting distance between the laser displacement meter 17 and the surface of the vehicle door 50 inputted from the displacement meter amplifier 29.

As is shown in FIG. 2, the work holding portion 3 includes a mount 34, a supporting pillar 32, and a work holder 33.

The mount 34 comprises a stand of a rectangular shape when viewed in a plane so that the vehicle door 50 can be mounted thereon, and a rubber mat 43 is provided on the mounting surface (top surface) on which the vehicle door 50 is mounted.

The supporting pillar 32 is provided on the mount 34 to stand along the vertical direction.

The work holder 33 includes a supporting arm 35, a handle 36, and a pressing member 37. The supporting arm 35 is fixed to the supporting pillar 32 at an arbitrary position in the top-and-bottom direction (a position corresponding to the upper end of the door panel 51 of the vehicle door 50) via an attaching member 38 at one end. Also, it is disposed in such a manner that the other end extends from the aforementioned end in the fore-and-aft direction to confront the upper end of the door panel 51 of the vehicle door 50.

The handle 36 includes an elevating shaft 41 and a manipulation portion 42. The elevating shaft 41 is attached to the other end of the supporting arm 35 to be free to ascend/descend in the top-and-bottom direction. The manipulation portion 42 is provided to the upper end of the elevating shaft 41 to be free to rotate in the horizontal direction. The handle 36 causes the elevating shaft 41 to ascend/descend with respect to the other end of the supporting arm 35 by rotating the manipulation portion 42 forward/backward.

The pressing member 37 includes a pressing plate 39 attached to the lower end of the elevating shaft 41, and an elastic member 40 made of rubber or the like and provided on the bottom surface of the pressing plate 39. The elastic member 40 is disposed to the upper end of the door panel 51 of the vehicle door 50 at a confronting position in the top-and-bottom direction.

When the elevating shaft 41 is caused to descend by rotating the manipulation portion 42 of the handle 36 forward while the lower end of the door panel 51 of the vehicle door 50 is mounted on the rubber mat 43 on the mount 34 and the upper end of the door panel 51 confronts the elastic member 40 in the top-and-bottom direction, the bottom surface of the elastic member 40 comes to abut on the upper end of the door panel 51 while being kept pressed against the upper end in association with a descent of the elevating shaft 41. This causes the door panel 51 to be elastically sandwiched between the rubber mat 43 and the elastic member 40. The vehicle door 50 is thus held by the work holding portion 3 in an upright state. In this upright state, the door panel 51 is disposed to be parallel to both the base frame 4 and the slide rod 12.

The vehicle door 50 includes the door panel 51 of nearly a rectangular shape when viewed from the front, and a window frame 52 provided on the top portion of the door panel 51. The outside surface (the surface confronting the laser displacement meter 17) of the door panel 51, which is held by the work holding portion 3 in the upright state, is formed as a curved surface curved along the vertical direction. To be more concrete, as is shown in FIG. 2, the outside surface of the door panel 51 is curved in the shape of a gentle arc such that the both ends in the top-and-bottom direction recede backward and the center in the top-and-bottom direction protrudes forward.

Figure 5:
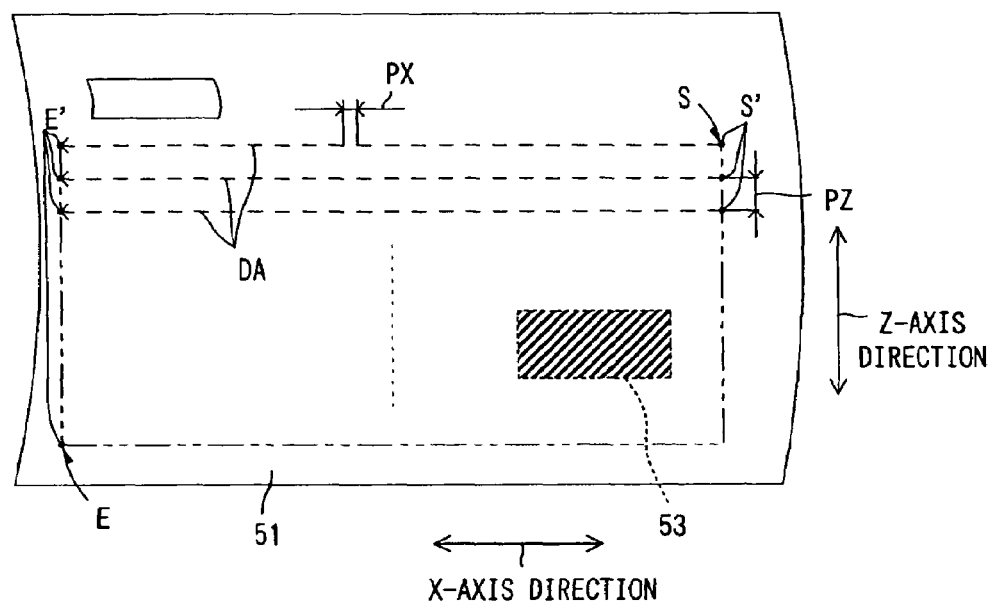
FIG. 5 is a front view of a door panel used to describe a surface shape measuring method.

Also, as is shown in FIG. 5, in order to reinforce the steel plate (metal plate) in rigidity, a reinforcing material 53, comprising a sheet of resin that cures with external energy, such as heat and UV rays, in a size of 100 mm×300 mm, is sticked to a sticking portion described below on the inside surface (the back surface on the opposite side of the outside surface confronting the laser displacement meter 17) of the door panel 51.

The vehicle door 50 held by the work holding portion 3 in this manner is disposed to the laser displacement meter 17 at a confronting position that moves three-dimensionally in the measuring portion 2 while being spaced apart in the fore-and-aft direction.

A method of measuring the surface shape of the outside surface of the door panel 51 by the measuring portion 2 will now be described. To measure the surface shape of the outside surface of the door panel 51, the surface shape measuring program is run from the main control program on the CPU 21.

Figure 4:
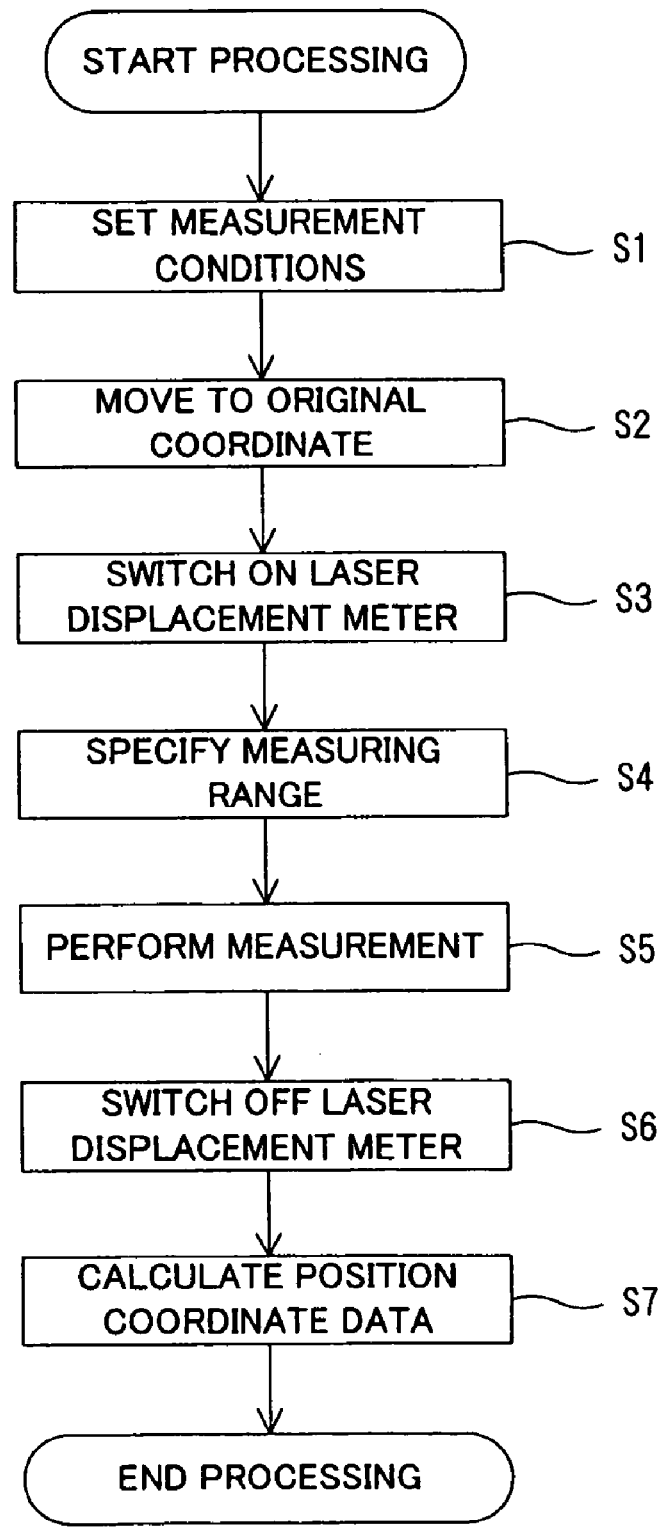
FIG. 4 is a flowchart of a surface shape measuring program.

FIG. 4 is a flowchart of the surface shape measuring program. When the processing by the surface shape measuring program is started to run, the measurement conditions are first set in the CPU 21 (S1). Herein, an X-axis pitch PX (see FIG. 5, for example, in the range of 0.01 to 1.0 mm) which is a measuring interval of the laser displacement meter 17 in the left-and-right direction (hereinafter, referred to as the X-axis direction) in which the laser displacement meter 17 is moved by the X-axis servo motor 22, and a Z-axis pitch PZ (see FIG. 5, for example, in the range of 1.0 to 50 mm) which is a measuring interval of the laser displacement meter 17 in the top-bottom direction (hereinafter, referred to as the Z-axis direction) in which the laser displacement meter 17 is moved by the Z-axis servo motor 24, are displayed on the monitor 30 as necessary conditions for the measurement. The operator thus sets the measurement conditions by inputting the X-axis pitch PX and the Z-axis pitch PZ with the keyboard 31.

When the measurement conditions are set, the laser displacement meter 17 is moved to the original position (S2), and the X-axis rotary encoder 23, the Z-axis rotary encoder 25, and the Y-axis rotary encoder 27 are subject to zero point adjustment at the original position.

After the laser displacement meter 17 is switched ON (S3), a measuring range is specified (S4).

The measuring range is specified, for example, as is shown in FIG. 5, by moving the laser displacement meter 17 by an input with the keyboard 31, so that a measurement starting point S and a measurement ending point E are specified to be diagonally opposite. A rectangular region when viewed from the front defined by the measurement starting point S and the measurement ending point E specified to be diagonally opposite is thus set as the measuring range.

The measurement starting point S is set at the upper right end and the measurement ending point E is set at the lower left end in FIG. 5. However, the setting of the measurement starting point S and the measurement ending point E is not particularly limited to the above configuration. For example, the measurement starting point S may be set at the lower left end and the measurement ending point E may be set at the upper right end.

After the measuring range is specified, the laser displacement meter 17 starts to measure the surface shape of the outside surface of the door panel 51.

When the measurement is started, the laser displacement meter 17 is moved to the measurement starting point S. At the measurement starting point S, the laser displacement meter 17 is driven by the Y-axis servo motor 26 to move in the fore-and-aft direction (hereinafter, referred to as the Y-axis direction), so that a confronting distance between the laser displacement meter 17 and the outside surface of the door panel 51 will be an optimum detection distance within a detectable distance range of the laser displacement meter 17.

The laser displacement meter 17 is then driven by the X-axis servo motor 22 to be scanned in the X-axis direction at the X-axis pitch that has been set previously from the measurement starting point S (in this case, the measurement starting point S is also a scan starting point S') to the position corresponding to the measurement ending point E (a scan ending point E' and a position confronting the measurement ending point E in the Z-axis direction). In this instance, the CPU 21 stores detected distances with respect to the outside surface of the door panel 51 per X-axis pitch detected by the laser displacement meter 17, and scan position data of the laser displacement meter 17 in the X-axis direction detected by the other X-axis rotary encoder 23 in a one-to-one correspondence with the detected distances, as scan data DA.

When the scan ends, the laser displacement meter 17 is driven by the X-axis servo motor 22 to return from the scan ending position E' to be positioned again at the measurement starting point S. The laser displacement meter 17 is not scanned when it returns to the measurement starting point S.

The laser displacement meter 17 is then driven by the Z-axis servo motor 24 to move to the scan starting point S' spaced apart from the measurement starting point S in the Z-axis direction by the Z-axis pitch that has been set previously (a position confronting the measurement starting point S in the Z-axis direction while being spaced apart by the Z-axis pitch), after which the laser displacement meter 17 is driven by the Y-axis servo motor 26 at the scan starting point S' to move in the Y-axis direction so that a confronting distance between the laser displacement meter 17 and the outside surface of the door panel 51 will be the optimum detection distance of the laser displacement meter 17. In this instance, the CPU 21 stores a quantity of displacement from the measurement starting point S to the scan starting point S' in the Y-axis direction detected by the Y-axis rotary encoder 27, as displacement data DB.

The laser displacement meter 17 is then driven by the X-axis servo motor 22 to be scanned in the X-axis direction at the X-axis pitch that has been set previously from the scan starting point S' to the scan ending point E' in the same manner as described above, and the scan data DA obtained in this manner is stored. When the scan ends, the laser displacement meter 17 is driven by the X-axis servo motor 22 to return from the scan ending point E' to be position again at the scan starting point S'. The laser displacement meter 17 is not scanned when it returns to the scan starting point S'.

Scans by the laser displacement meter 17 in the X-axis direction at the X-axis pitch as described above are carried out successively along the Z-axis at the Z-axis pitch, and the measurement ends when the laser displacement meter 17 reaches the measurement ending point E.

Subsequently, after the laser displacement meter 17 is switched OFF (S6), the CPU 21 calculates three-dimensional position coordinates within the measuring range on the basis of the detected distances per X-axis pitch within the measuring range on the outside surface of the door panel 51 (that is, the scan data DA) and quantities of displacement per Z-axis pitch in the Y-axis direction (that is, the displacement data DB) (S7). The CPU 21 then stores the three-dimensional position coordinate data thus calculated, and ends the measurement processing.

In the surface shape measuring apparatus 1, even when the laser displacement meter 17 is moved by the Z-axis servo motor 24 in the Z-axis direction per Z-axis pitch, the CPU 21 controls the Y-axis servo motor 26 to move the laser displacement meter 17 in the Y-axis direction in such a manner that a confronting distance between the laser displacement meter 17 and the outside surface of the door panel 51 will be the optimum detection distance of the laser displacement meter 17. Hence, even when the outside surface of the door panel 51 is curved in the Y-axis direction in the shape of a gentle arc along the Z-axis direction, the confronting distance between the laser displacement meter 17 and the outside surface of the door panel 51 is maintained to be the optimum detection distance. Hence, the laser displacement meter 17 can be scanned along the X-axis by the X-axis servo motor 22 at each position spaced apart by the Z-axis pitch in the Z-axis direction along the curved direction of the outside surface of the door panel 51 while maintaining a constant confronting distance between the laser displacement meter 17 and the outside surface of the door panel 51.

The position coordinates of the door panel 51 can be therefore measured at high accuracy by the laser displacement meter 17 having quite high measuring accuracy but a narrow detectable distance range. In addition, because the measurement can be performed accurately, even when the outside surface of the door panel 51 is coated, a minute distortion can be detected precisely regardless of the presence of gloss.

Because the work holding portion 3 is provided as a body separate from the measuring portion 2, it is possible in this measurement to measure the surface shape of the outside surface of the door panel 51 regardless of the size of the door panel 51. Hence, even when the door panel 51 is large, the surface shape of the door panel 51 can be measured accurately.

Also, the position coordinates of the outside surface of the door panel 51 can be measured by holding the door panel 51 in the upright state by the work holding portion 3 while driving the laser displacement meter 17 by the Z-axis servo motor 24 to move along the Z-axis direction in the measuring portion 2. It is thus possible to achieve space-saving and efficient measurement in comparison with a case where the position coordinates are measured while the door panel 51 is disposed in the horizontal direction.

The position coordinate data thus obtained and stored in the CPU 21 is analyzed by various analysis programs pre-installed in the CPU 21, such as the contour map creating program, the smoothing processing program, the differentiation processing program, the position specifying program, and the sticking portion display program.

An analyzing method by various analysis programs will now be described.

The analysis by the contour map creating program will be described first. When the contour map creating program is run from the main control program by an input with the keyboard 31, the position coordinate data stored in the CPU 21 is transformed to a contour map matching with the surface shape. The contour map is displayed on the monitor 30 as is shown in FIG. 6(a).

In the contour map, height intervals of the contour lines (the number of contour lines) can be set arbitrarily by an input with the keyboard 31. Also, an arbitrary cross section along the X-axis direction and the Z-axis direction can be displayed by an input with the keyboard 31.

Figure 6:
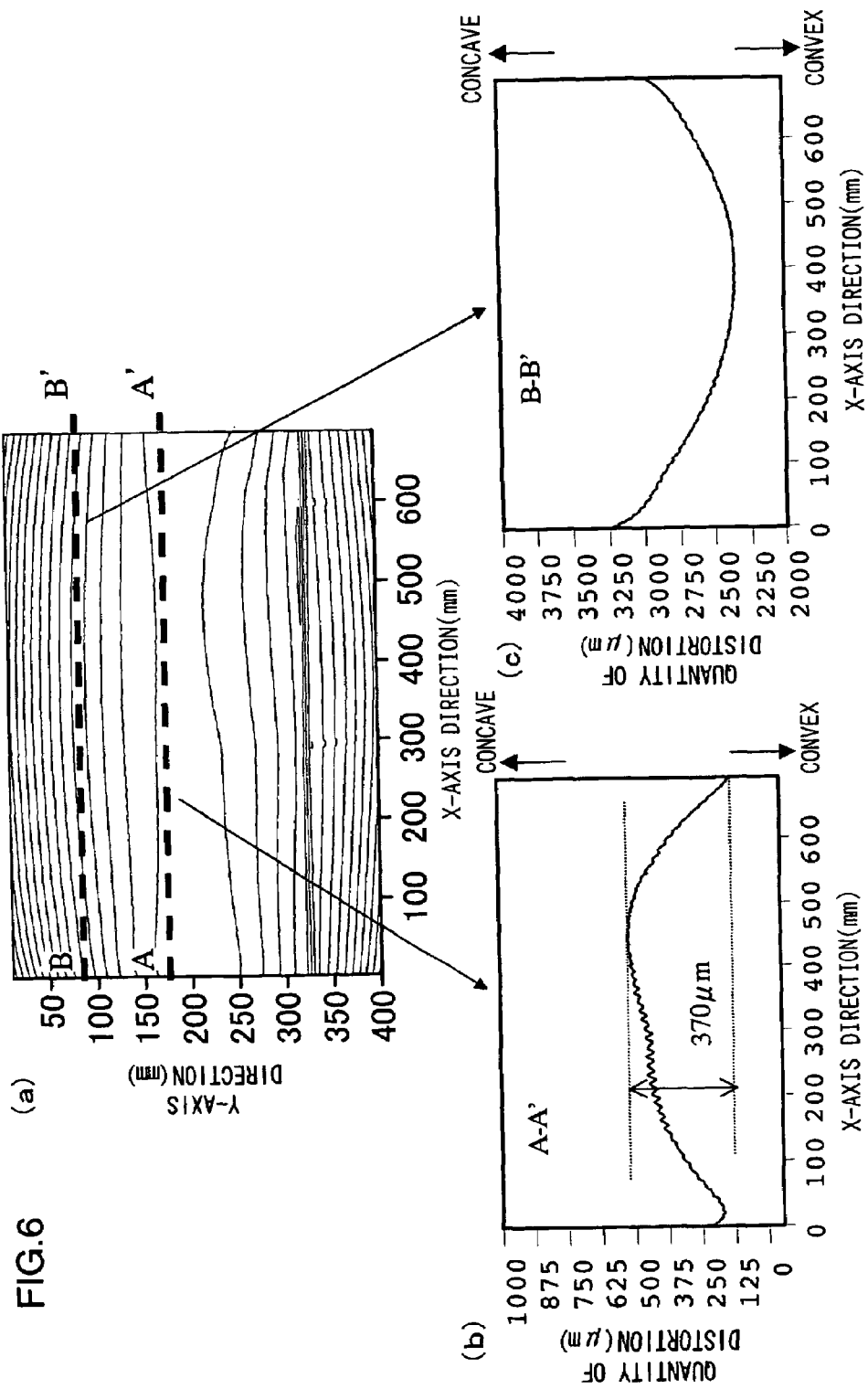
FIG. 6(a) shows one example of a contour map created by a contour map creating program.
FIG. 6(b) is a cross section taken along the line A-A' of FIG. 6(a)
FIG. 6(c) is a cross section taken along the line B-B' of FIG. 6(a)

The contour map shown in FIG. 6(a) shows the surface shape of the outside surface including the above-described sticking portion of the reinforcing material 53. The A-A' line of FIG. 6(a) indicates a sectional line in the X-axis direction including the sticking portion of the reinforcing material 53, and the cross section taken along this sectional line is shown in FIG. 6(b). Also, the line B-B' indicates a sectional line in the X-axis direction excluding the sticking portion of the reinforcing material 53, and the cross section taken along this sectional line is shown in FIG. 6(c).

Referring to FIG. 6(b) and FIG. 6(c), when a quantity of distortion (a quantity of displacement in the Y-axis direction) takes a large numerical value, it means that the outside surface is concave inward, and when a quantity of distortion (a quantity of displacement in the Y-axis direction) takes a small numerical value, it means that the outside surface is convex outward.

It is confirmed from FIG. 6(b) and FIG. 6(c) that the outside surface is a gentle convex curved surface in a portion including the cross section taken along the line B-B' indicating the portion other than the sticking portion of the reinforcing material 53, whereas the outside surface is a deep concave curved-surface in the portion including the cross section taken along the line A-A' indicating the sticking portion of the reinforcing material 53. In addition, a quantity of the concave can be quantified to be 370 μm.

By displaying the position coordinate data as the contour map matching with the surface shape in this manner, it is possible to judge the presence or absence of a distortion three-dimensionally and schematically. In addition, both the position of a distortion and a quantity of the distortion can be confirmed to some extent. Hence, a distortion on the outside surface can be measured at high accuracy for the door panel 51 to which the reinforcing material 53 is sticked.

However, one may fail to judge a minute distortion by merely displaying the position coordinate data as a contour map simply matching with the surface shape. In other words, because the door panel 51 has a curved surface that is curved in the Y-axis direction along the Z-axis direction, a quantity of displacement in the Y-axis direction induced from the distortion may be cancelled out by a quantity of displacement in the Y-axis direction induced from the curved surface, which makes it impossible to judge a minute distortion.

In this case, the presence or absence of such a minute distortion can be indicated explicitly by running the smoothing processing program and the differential processing program.

That is to say, when the smoothing processing program is run from the main control program, the position coordinate data is transformed to the position coordinates on a virtual plane in the smoothing processing program. To be more concrete, in the smoothing processing program, as is shown in FIG. 7(a), a difference ΔD between a quantity of displacement, D1, in the Y-axis direction at each scan starting point S' and a quantity of displacement, D2, in the Y-axis direction at each scan ending point E' is first calculated from respective items of the scan data DA in the X-axis direction.

Figure 7:
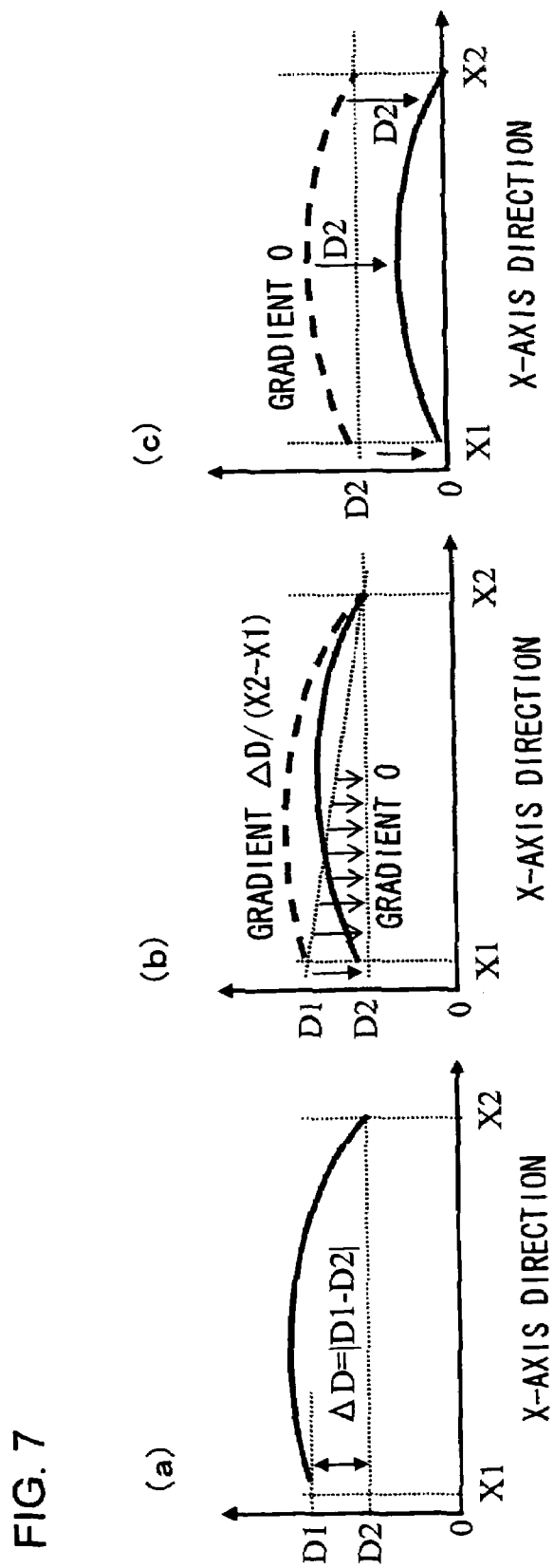
FIG. 7 is a view used to describe processing by a smoothing processing program.

Then, as is shown in FIG. 7(b), a gradient, ΔD/(X2−X1), where X1 is the position coordinate of the scan starting point S' in the X-axis direction and X2 is the position coordinate of the scan ending point E', is calculated. Subsequently, a gradient component is subtracted from respective quantities of displacement, D1 to D2, in the Y-axis direction calculated from respective items of the scan data DA, so that the gradient in the X-axis direction will be 0 (zero). Respective items of the scan data DA is thus corrected in such a manner that a straight line linking the scan starting point S' and the scan ending point E' is parallel to the X-axis direction.

Subsequently, as is shown in FIG. 7(c), each quantity of displacement, D1, in the Y-axis direction at the scan starting point S' calculated from each item of the scan data DA and each quantity of displacement, D2, in the Y-axis direction at the scan ending point E' calculated from each item of the scan data DA are all adjusted to be the same quantity of displacement (for example, adjusted to be 0 by subtraction). The alignment direction of respective items of the scan data DA is thereby corrected to be parallel to the Z-axis direction.

The position coordinate data is thus transformed to a virtual plane parallel to a plane extending in the X-axis direction and the Z-axis direction.

Figure 8:
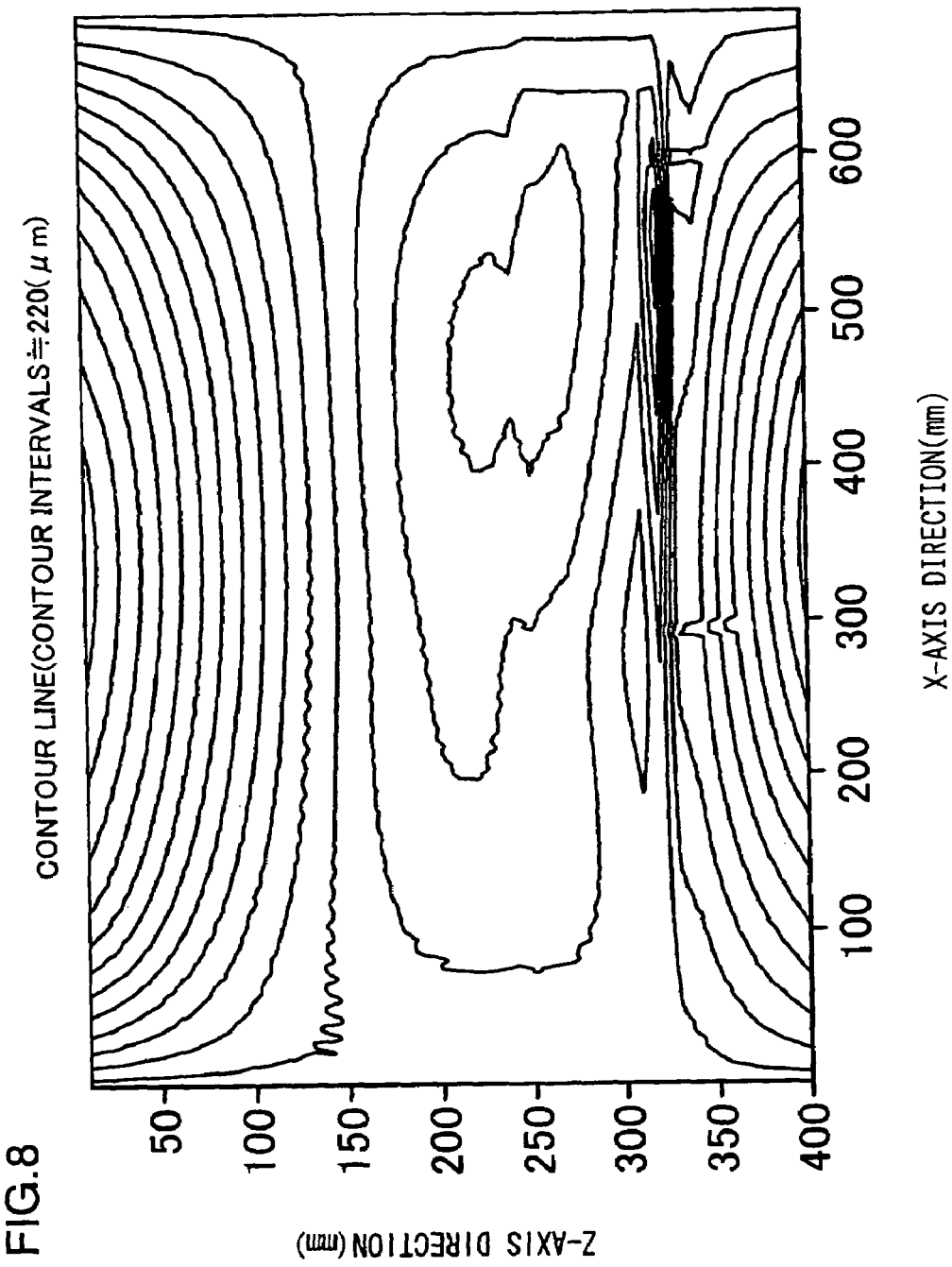
FIG. 8 shows one example of a contour map obtained by running the smoothing processing program.

In the smoothing processing program, the contour map thus corrected is displayed on the monitor 30 as is shown in FIG. 8. In FIG. 8, the surface shape of the outside surface is displayed sharply at a level that cannot be achieved in FIG. 6(a) before the correction.

Also, when the differential processing program is run from the main control program by an input with the keyboard 31, the contour map transformed to the virtual plane by the smoothing processing program is analyzed in the X-axis direction by differentiation in the differential processing program. To be more concrete, this processing is to calculate differential coefficients for respective items of the scan data DA that has been corrected by the smoothing processing program. A known three-point approximation formula or five-point approximation formula is used for differentiation.

Figure 9:
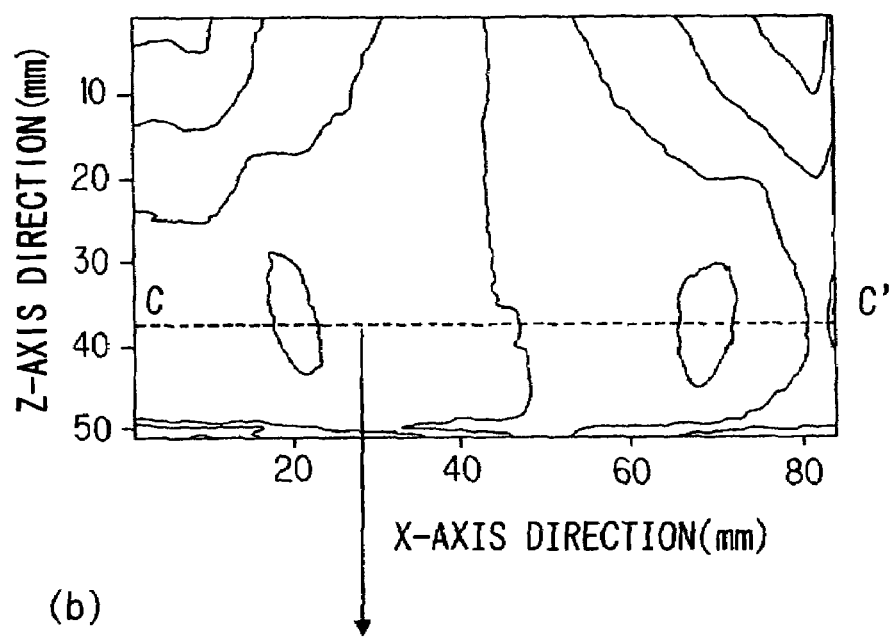
FIG. 9(a) shows a first order differential contour map obtained by running a differentiation processing program.
FIG. 9(b) is a cross section taken along the line C-C' of FIG. 9(a)
Figure 9:
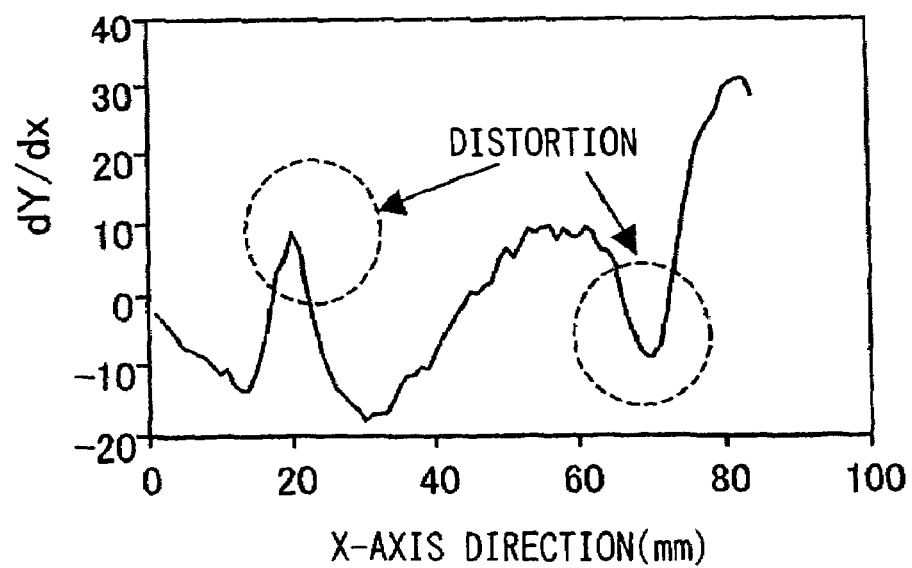

FIG. 9(a) shows a contour map obtained by analyzing the contour map transformed to the virtual plane, by differentiation (first order differential) using a three-point approximation formula. FIG. 9(b) shows the cross section taken along the line C-C' of FIG. 9(a).

As are shown in FIGS. 9(a) and 9(b), in a portion where a gradient varies markedly, that is, a portion with a distortion, a large differential coefficient is obtained by differentiation. Hence, the position of a distortion is highlighted, which makes it easier to specify the position at which a distortion occurs. It is thus possible to detect a distortion more precisely.

Figure 10:
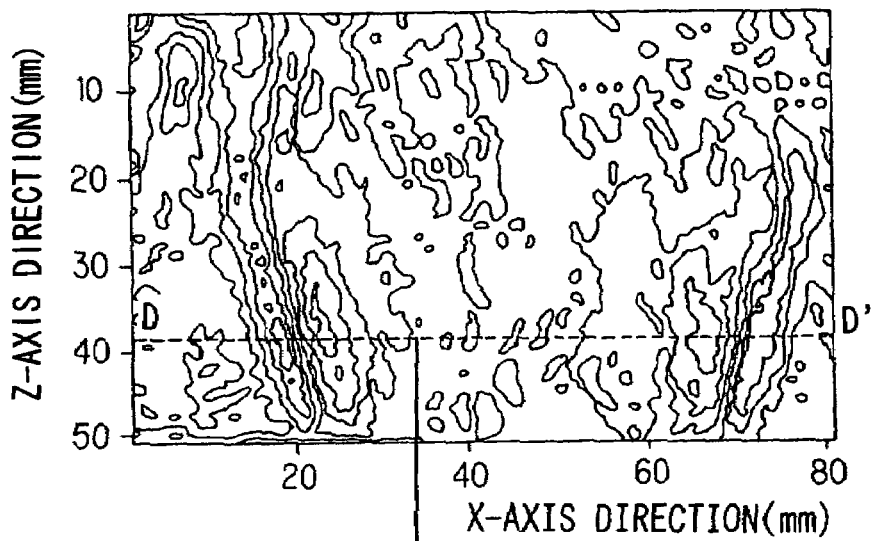
FIG. 10(a) shows a second order differential counter map obtained by running the differentiation processing program.
FIG. 10(b) is a cross section taken along the line D-D' of FIG. 10(a)
Figure 10:
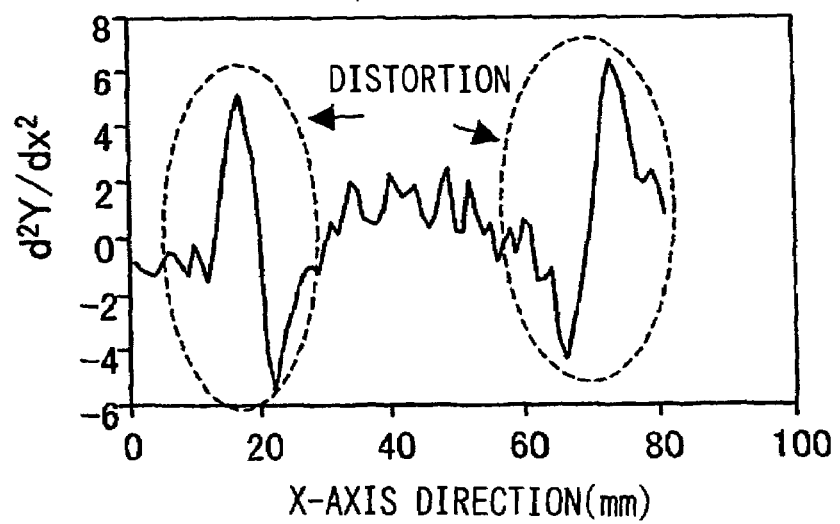

FIG. 10(a) shows a contour map obtained by further analyzing the differentiated (first order differential) contour map by differentiation (second order differential). FIG. 10(b) shows the cross section taken along the line D-D' of FIG. 10(a).

As are shown in FIGS. 10(a) and 10(b), the positions of distortions can be highlighted further by performing differentiation twice (second order differential).

The first order differential and the second order differential as described above can be performed by an input with the keyboard 31. That is, when the differentiation processing program is run from the main control program by an input with the keyboard 31, the first order differential as described above is performed, and the contour map shown in FIG. 9(a) is displayed on the monitor 30. Because an arbitrary cross section of the contour map along the X-axis direction and the Z-axis direction can be displayed by an input with the keyboard 31 as described above, the cross section shown in FIG. 9(b) can be displayed on the monitor 30. Also, after the first order differential is performed and the contour map shown in FIG. 9(a) is displayed on the monitor 30, the second order differential as described above can be performed further by an input with the keyboard 31. When the second order differential as described above is performed, the contour map shown in FIG. 10(a) is displayed on the monitor 30. Because an arbitrary cross section of the contour map along the X-axis direction and the Z-axis direction can be displayed by an input with the keyboard 31 as described above, the cross section shown in FIG. 10(b) can be displayed on the monitor 30.

Moreover, the position specifying program for specifying the actual position of a distortion, and the sticking portion display program for indicating a relation between the sticked position of the reinforcing material 53 and a distortion are pre-installed in the CPU 21. Hence, by running these programs from the main control program, it is possible to specify the actual position of a distortion and understand the relation between the sticked position of the reinforcing material 53 and a distortion with ease.

Figure 11:
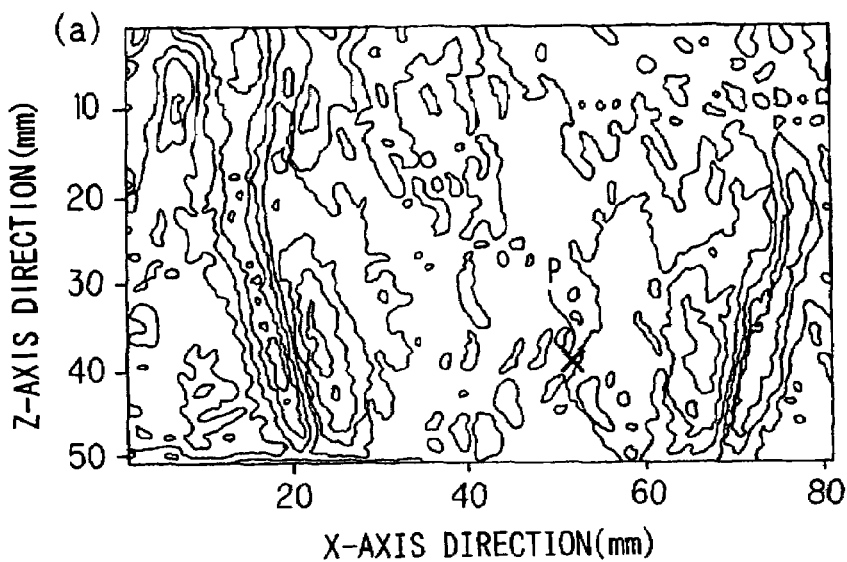
FIG. 11 is a view used to describe processing by a position specifying program.
Figure 11:
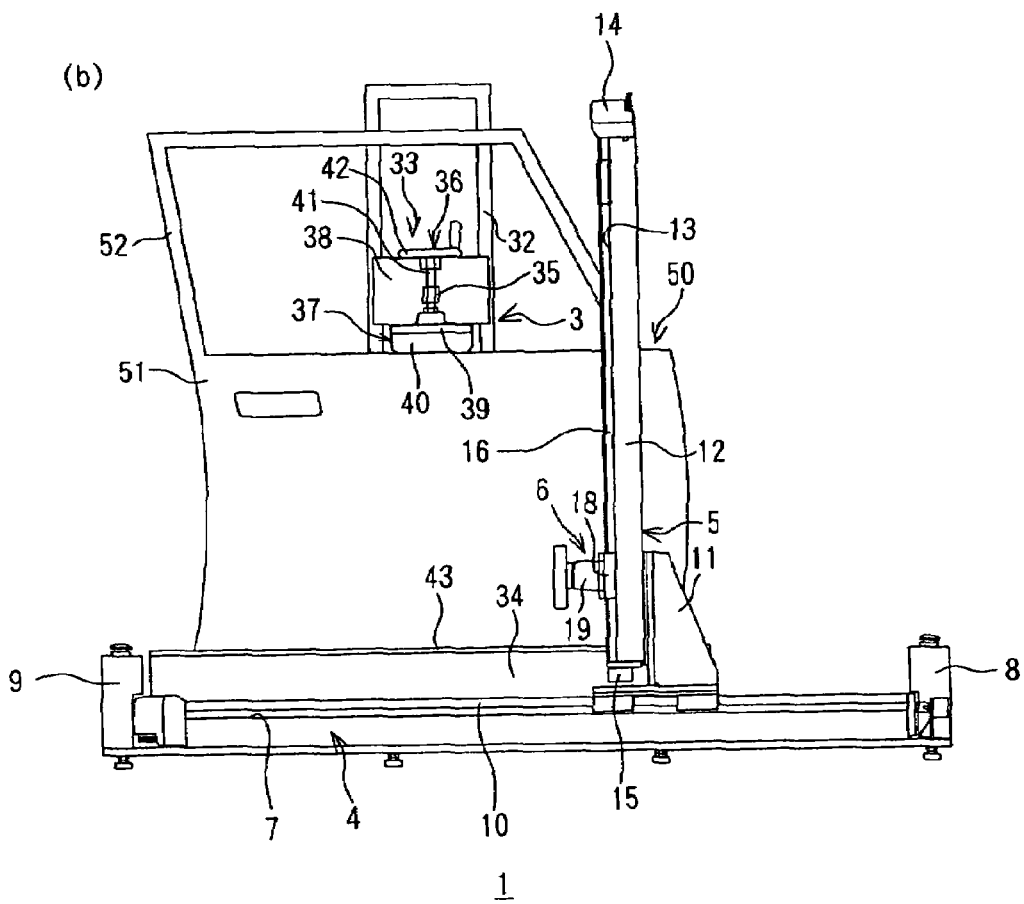

That is to say, when the position of a distortion is specified by various kinds of processing as described above, as is shown in FIG. 11(a), the pointer P is positioned on the position of the distortion on the contour map obtained by various kinds of processing as described above by an input with the keyboard 31, and the position specifying program is run from the main control program by an input with the keyboard 31. Then, as is shown in FIG. 11(b), the laser displacement meter 17 is moved to a particular confronting position with respect to the outside surface of the door panel 51 that corresponds to the position of the pointer P, on the basis of the position coordinates of the pointer P on the contour map (the laser displacement meter 17 is hidden by the sensor holder 19 in FIG. 11(b)). It is thus possible to confirm the actual position at which a distortion occurs on the outside surface of the door panel 51 with ease.

As has been described, the reinforcing material 53 is sticked to the door panel 51 on the inside surface. The reinforcing material 53 is in the form of a sheet made of resins that cure with external energy, such as heat and UV rays. Hence, after the coating is applied, for example, the reinforcing material 53 protrudes whereas the door panel 51 shrinks due to a difference of coefficients of linear expansion between the reinforcing material 53 made of such a resin and the door panel 51 comprising a steel plate. This readily gives rise to a concave distortion called "sink" on the outside surface of the door panel 51 in a portion corresponding to the sticking portion.

Figure 12:
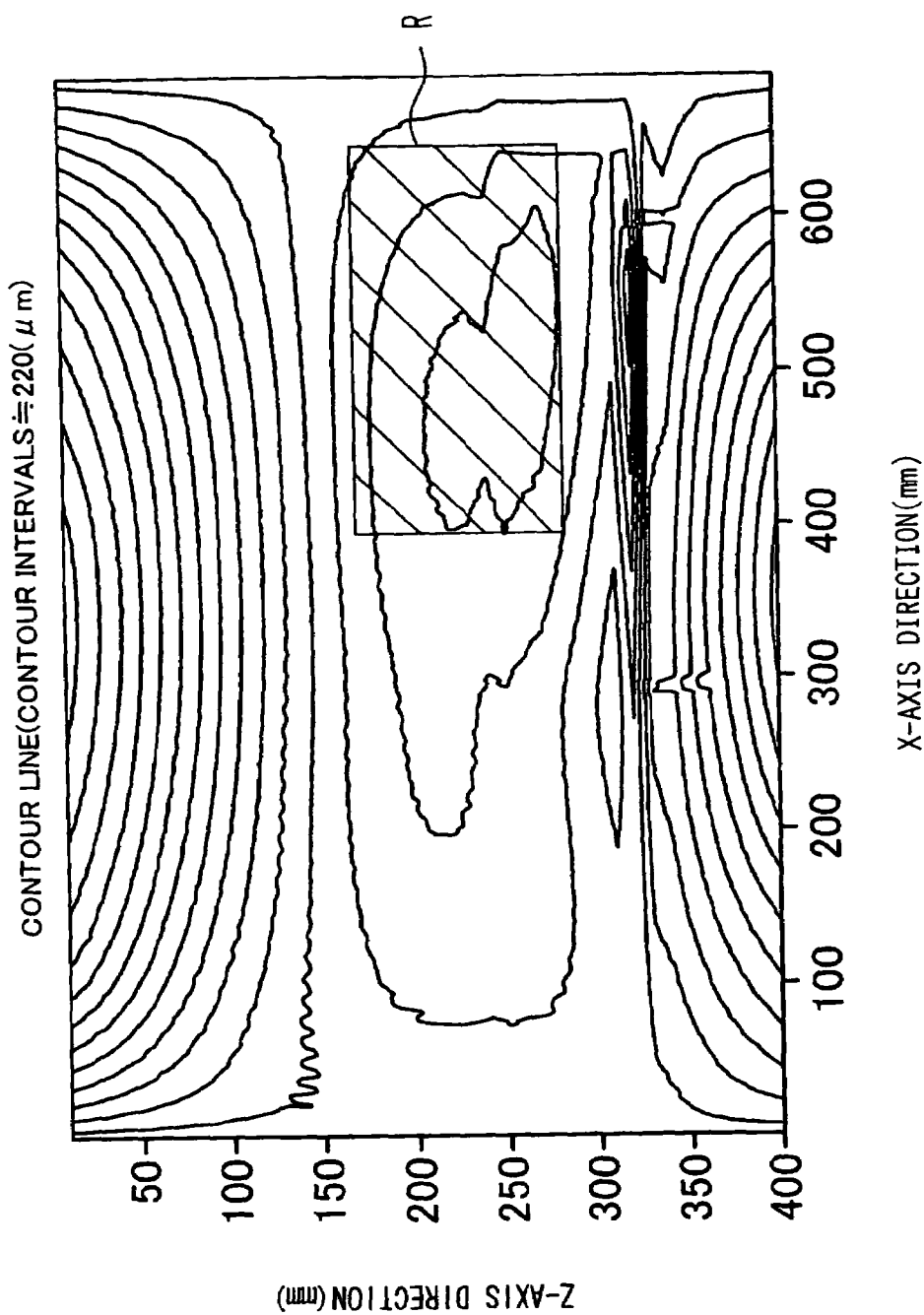
FIG. 12 shows one example of a contour map displayed by running a sticking portion display program.

With this being the situation, the sticking portion display program is run, so that one can understand the relation between the sticked position of the reinforcing material 53 and a distortion. That is to say, when the position of a distortion is specified by various kinds of processing as described above, the sticking portion display program is run from the main control program by an input with the keyboard 31 on the contour map obtained by various kinds of processing as described above. Then, as is shown in FIG. 12, the sticking portion R of the reinforcing material 53 is superimposed on the contour map displayed on the monitor 30.

Because the sticking portion of the reinforcing material 53 on the door panel 51 is mapped as the sticking portion R and displayed on the contour map, the relation between the distortion and the reinforcing material 53 can be readily confirmed.

The sticking portion of the reinforcing material 53 has been marked previously by moving the laser displacement meter 17 to the actual sticking portion of the reinforcing material 53 on the door panel 51, and the marked region (sticking portion) is stored in the CPU 21. The marked region is displayed as a pop-up display on each contour map by the sticking portion display program.

In the description above, the door panel 51 is held in an upright state by the work holding portion 3. However, for example, the door panel 51 attached to a finished vehicle may be measured directly without using the work holding portion 3.

Also, the description above described the surface shape measuring apparatus of the present invention using a case where the outside surface of the door panel 51 of the vehicle door 50 is measured by way of example. However, the surface shape measuring apparatus of the present invention is also able to measure a work other than the vehicle door 50, and for example, it is able to measure the bonnet of a vehicle as well. The surface shape measuring apparatus of the present invention is suitably used when measuring the surface shape of a large-scaled work whose surface is a curved surface.

While the illustrative embodiments of the present invention are provided in the above description, such is for illustrative purpose only and is not to be construed restrictively. Modifications and variation of the present invention that will be obvious to those skilled in the art is to be covered by the following claims.

The disclosure of Japanese patent application Serial Nos. 2004-102775, filed on Mar. 31, 2004 and 2004-342864, filed on Nov. 26, 2004, are incorporated herein by reference.

What is claimed is:

1. A surface shape measuring apparatus to measure locations of distortions on a curved surface of a work piece and a location of a reinforcing material that is provided on an interior surface of the work piece comprising:

a measuring portion, wherein said measuring portion comprises:
   a non-contact sensor disposed a pre-selected distance away from the curved surface of said work piece, the non-contact sensor being adapted to scan the curved surface of the work piece;
   Z-axis moving means for moving said non-contact sensor with respect to the curved surface of said work piece along a curved direction in which the curved surface of said work is curved;
   X-axis moving means for moving said non-contact sensor with respect to the curved surface of said work piece in a direction intersecting at right angles with said curved direction;
   Y-axis moving means for moving said non-contact sensor with respect to the curved surface of said work piece along a confronting direction in which said non-contact sensor and the curved surface of said work piece oppose each other, while maintaining a constant distance in the confronting direction; and
processing means for receiving scan data obtained from the non-contact sensor, the processing means being configured to identify locations of distortions that are present on a surface of the work piece and to identify a location of the reinforcing material that is provided on the interior surface of the work piece, wherein the processing means calculates positional relationships between the locations of the identified distortions on the surface of the work piece and the location of the reinforcing material.

2. The surface shape measuring apparatus according to claim 1, wherein:
   said work piece is disposed in such a manner that the curved direction of the curved surface extends along a vertical direction; and
   said Z-axis moving means moves said non-contact sensor along the vertical direction.

3. The surface shape measuring apparatus according to claim 1, further comprising:
   a work piece holding portion, separated from said measuring portion, to hold said work piece in a state that the curved direction of the curved surface of said work extends along a vertical direction.

4. The surface shape measuring apparatus according to claim 1, wherein:
   said work piece is a metal plate on which a reinforcing material is laminated on a back surface that is positioned on an opposite side of a surface confronting said non-contact sensor.

5. The surface shape measuring apparatus according to claim 4, wherein:
   said reinforcing material is in the form of a sheet made of a resin that cures with external energy, and is affixed to the back surface of said metal plate to reinforce said metal plate.

6. The surface shape measuring apparatus according to claim 1, wherein:
   said work piece is a steel plate for a vehicle.

7. The surface shape measuring apparatus according to claim 1, wherein:
   said non-contact sensor is a laser displacement meter.

8. The surface shape measuring apparatus according to claim 1, further comprising:
   contour map creating means for communicating with the processor means to calculate a position coordinate of the curved surface of said work piece based on said scan data, and creating a contour map that is used to identify a distortion on the curved surface of said work piece, based on the position coordinate.

9. The surface shape measuring apparatus according to claim 1, further comprising:
   smoothing processing means for communicating with the processing means to transform the position coordinate of the curved surface of said work piece to a position coordinate on a virtual plane.

10. The surface shape measuring apparatus according to claim 1, further comprising:
    differentiation processing means for communicating with the processing means to analyze said scan data by differentiation.

11. The surface shape measuring apparatus according to claim 1, further comprising:
    position specifying means for communicating with the processing means to move said non-contact sensor to a pre-selected confronting position with respect to the curved surface of said work piece that corresponds to a pre-selected position coordinate, on the basis of the position coordinate of the curved surface of said work piece.

12. The surface shape measuring apparatus according to claim 1, further comprising:
    laminated position display means for communicating with the processing means to display a laminated position on said contour map that corresponds to a position of said reinforcing material that is laminated on said work piece.

13. A surface shape measuring method for measuring a distortion on a curved surface of a work piece and a location of a reinforcing material that is provided on an interior surface of the work piece comprising:
    scanning a non-contact sensor over the curved surface of the work piece;
    calculating position coordinates of the curved surface of said work piece based on scan data obtained during scanning;
    creating a contour map;
    identifying locations of distortions that are present on the curved surface of said work piece based on the calculated position coordinates;
    identifying a location of the reinforcing material that is provided on the interior surface of the work piece;
    calculating positional relationships between the locations of the identified distortions on the surface of the work piece and the location of the reinforcing material; and
    positioning the non-contact sensor over selected locations on the work piece that correspond to the identified distortions.

14. The surface shape measuring method according to claim 13, further comprising:
    transforming the position coordinates of the curved surface of said work piece to a position coordinate on a virtual plane.

15. The surface shape measuring method according to claim 13, further comprising:
    analyzing said scan data by differentiation.

16. The surface shape measuring method according to claim 13, further comprising:
    moving said non-contact sensor to a pre-selected confronting position with respect to the curved surface of said work piece that corresponds to a pre-selected position coordinate, on the basis of the position coordinate of the curved surface of said work piece.

17. The surface shape measuring method according to claim 13, further comprising:
    displaying a laminated position on said contour map that corresponds to a position of said reinforcing material that is affixed on said work piece.

\* \* \* \* \*